United States Patent
Singh et al.

(10) Patent No.: US 10,922,781 B1
(45) Date of Patent: Feb. 16, 2021

(54) SYSTEM FOR PROCESSING IMAGES FROM MULTIPLE IMAGE SENSORS

(71) Applicant: NXP USA, Inc., Austin, TX (US)

(72) Inventors: Chanpreet Singh, SAS Nagar (IN); Stephan Matthias Herrmann, Markt Schwaben (DE); Rahul Jain, Noida (IN); Gaurav Gupta, Noida (IN); Pranshu Agrawal, New Delhi (IN); Navarshi Dhiman, Faridabad (IN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/704,183

(22) Filed: Dec. 5, 2019

(51) Int. Cl.
*G06T 1/60* (2006.01)
*G06F 13/16* (2006.01)
*G06T 1/20* (2006.01)

(52) U.S. Cl.
CPC ............ *G06T 1/60* (2013.01); *G06F 13/1621* (2013.01); *G06F 13/1663* (2013.01); *G06T 1/20* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 5,844,532 A * | 12/1998 | Silverbrook | G09G 3/3629 345/89 |
| 7,724,284 B2 | 5/2010 | Mentzer | |
| 8,493,482 B2 | 7/2013 | Cote et al. | |
| 8,683,184 B1 | 3/2014 | Lew et al. | |
| 9,628,718 B2 | 4/2017 | Campbell et al. | |
| 2010/0182391 A1* | 7/2010 | Yasui | G06K 15/1247 347/224 |
| 2018/0288344 A1* | 10/2018 | Chu | H04N 5/23241 |
| 2020/0082689 A1* | 3/2020 | Krajnc | G08B 13/1961 |

FOREIGN PATENT DOCUMENTS

KR 101283383 B1 7/2013

* cited by examiner

*Primary Examiner* — Joni Hsu
(74) *Attorney, Agent, or Firm* — Rajeev Madnawat (57) ABSTRACT

A system for processing multiple images includes an access serializer, trigger controllers, a first-in-first-out (FIFO) memory, and an image signal processing (ISP) pipeline circuit. The access serializer serializes access requests that are associated with processing of input image lines of the images. The trigger controllers decode corresponding serialized access requests to generate trigger identifiers (IDs), respectively. The FIFO memory receives a corresponding trigger ID from each trigger controller and provides the trigger IDs to the ISP pipeline circuit based on an order of reception of the trigger IDs. The ISP pipeline circuit receives the input image lines associated with the trigger IDs, and based on a corresponding set of configuration parameters associated with the input image lines, processes the input image lines in an order of reception of the trigger IDs, to generate processed image lines, respectively.

20 Claims, 11 Drawing Sheets

SYSTEM FOR PROCESSING IMAGES FROM MULTIPLE IMAGE SENSORS

BACKGROUND

The present invention relates generally to image processing, and, more particularly, to a system for processing multiple images on a System-on-Chip (SoC).

An SoC typically receives images that are captured by various image sensors, for processing of the images. For example, in an advanced driver alert system (ADAS) that is implemented on an SoC in a vehicle, the SoC receives images from various image sensors that are placed at different locations such as the front, rear, and side of the vehicle. Each image sensor has a different resolution and a different frame rate, that are based on a position of each image sensor in the vehicle. A known technique for on-the-fly (OTF) processing of such images, stores received image lines of each image in a memory of the SoC and stitches the image lines to generate a large image stream. However, the different frame rates of each image sensor and stitching of the images lines on the SoC, causes latency in the OTF processing. Further, as the exposure value of each image sensor is different, the light captured by each image sensor is different. Due to the difference in exposure values and resolutions of each image sensor, the quality of such a large image stream is degraded.

Thus, it would be advantageous to have a system that reduces latency for OTF processing of the images and overcomes the aforementioned problems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a system for processing a plurality of input images. The system includes an access serializer, a plurality of trigger controllers, a first-in-first-out (FIFO) memory, and an image signal processing (ISP) pipeline circuit. The access serializer receives a plurality of access requests associated with processing of a plurality of input image lines, and a plurality of configuration parameters associated with the plurality of input image lines, respectively. The access serializer serializes the plurality of access requests and outputs the serialized plurality of access requests and the plurality of configuration parameters, respectively. Each input image of the plurality of input images includes a corresponding set of input image lines of the plurality of input image lines. The plurality of trigger controllers are connected to the access serializer for receiving the serialized plurality of access requests and the plurality of configuration parameters. The plurality of trigger controllers decode the serialized plurality of access requests to generate a plurality of trigger signals and a plurality of trigger identifiers (IDs), respectively. The FIFO memory is connected to the plurality of trigger controllers for receiving the plurality of trigger IDs. The FIFO memory outputs the plurality of trigger IDs based on an order of reception of the plurality of trigger IDs. The ISP pipeline circuit receives the plurality of trigger IDs, the plurality of configuration parameters, and the plurality of input image lines. The ISP pipeline circuit processes the plurality of input image lines to generate a plurality of processed image lines, respectively. The plurality of input images are processed by processing the plurality of input image lines in an order of reception of the plurality of trigger IDs by the ISP pipeline circuit, respectively. A first input image line of the plurality of input image lines is processed based on a first trigger ID of the plurality of trigger IDs and a first set of configuration parameters of the plurality of configuration parameters, to generate a first processed image line of the plurality of processed image lines.

In another embodiment, the present invention provides a method for processing a plurality of input images. The method includes receiving, by an access serializer of a System-on-Chip (SoC), a plurality of access requests associated with processing of a plurality of input image lines, respectively, and serializing, by the access serializer, the plurality of access requests to output the serialized plurality of access requests. Each input image of the plurality of input images includes a corresponding set of input image lines of the plurality of input image lines. The method further includes decoding, by a plurality of trigger controllers of the SoC, the serialized plurality of access requests to generate a plurality of trigger signals and a plurality of trigger IDs, respectively. The method further includes outputting, by a FIFO memory of the SoC, the plurality of trigger IDs based on an order of reception of the plurality of trigger IDs by the FIFO memory from the plurality of trigger controllers, and processing, by an ISP pipeline circuit of the SoC, the plurality of input image lines to generate a plurality of processed image lines, respectively. The plurality of input images are processed by processing the plurality of input image lines in an order of reception of the plurality of trigger IDs by the ISP pipeline circuit, respectively, such that a first input image line of the plurality of input image lines is processed based on a first trigger ID of the plurality of trigger IDs and a first set of configuration parameters associated with the first input image line to generate a first processed image line of the plurality of processed image lines.

Various embodiments of the present invention provide a system for processing a plurality of input images. The system includes an access serializer, a plurality of trigger controllers, a FIFO memory, and an ISP pipeline circuit. The access serializer serializes a plurality of access requests associated with processing of a plurality of input image lines of the plurality of input images. The plurality of trigger controllers decode the serialized plurality of access requests to generate a plurality of trigger signals and a plurality of trigger IDs, such that the plurality of trigger IDs are associated with the plurality of input image lines, respectively. The FIFO memory receives the plurality of trigger IDs, and outputs the plurality of trigger IDs based on an order of reception of the plurality of trigger IDs. The ISP pipeline circuit processes the plurality of input image lines and generates a plurality of processed image lines in an order of reception of the corresponding plurality of trigger IDs, respectively.

The ISP pipeline circuit processes an input image line based on a set of configuration parameters associated with a corresponding trigger ID. As one input image line is processed at a time, the quality of the processed image line is not degraded due to different exposure values, different resolutions, and different frame rates of multiple image sensors that capture the input images. Further, the ISP pipeline circuit processes the plurality of input image lines based on the plurality of trigger IDs received by the ISP pipeline circuit and refrains from stitching of the input image lines to generate a single image stream. Thus, the latency for on-the-fly processing of each input image is reduced as compared to the latency incurred by conventional techniques that implement stitching of the input image lines.

Figure 1:
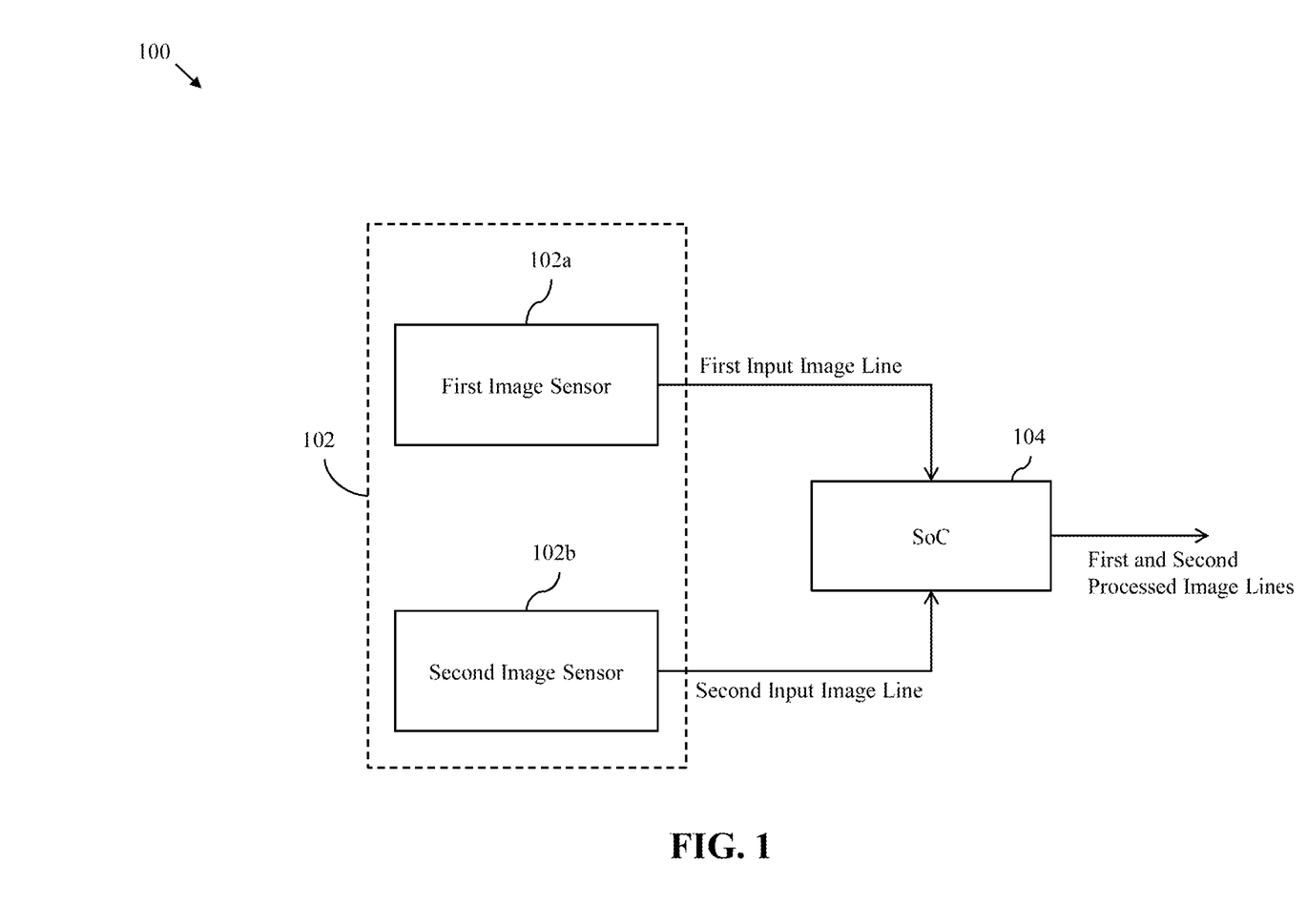
FIG. 1 is a schematic block diagram of a system for processing multiple input images in accordance with an embodiment of the present invention.

Referring now to FIG. 1, a schematic block diagram of a system 100 for processing multiple input images, in accordance with an embodiment of the present invention is shown. Each input image includes a corresponding set of input image lines. Further, each input image line is an array of pixel data. The system 100 may be utilized in automotive applications such as an advanced driver alert system (ADAS), consumer applications such as a home security system, or industrial applications such as an industrial robotic system. The system 100 includes multiple image sensors 102 of which first and second image sensors 102a and 102b are shown. The system 100 further includes a System-on-Chip (SoC) 104.

The first and second image sensors 102a and 102b capture and output first and second input images by capturing and outputting first and second sets of input image lines, respectively. The first and second sets of input image lines include first and second input image lines, respectively. In presently preferred embodiment, the first and second image sensors 102a and 102b have different resolutions, different frame rates, and different exposure values. In another embodiment, the first and second image sensors 102a and 102b have same resolutions, same frame rates, and same exposure values. Examples of the first and second image sensors 102a and 102b include a bayer image sensor, a monochrome image sensor, an infrared bayer image sensor, and the like. It will be apparent to those of skill in the art that the scope of the system 100 is not limited to two image sensors, and may include any number of image sensors without deviating from the scope of the invention.

The SoC 104 is connected to the first and second image sensors 102a and 102b for receiving the first and second input image lines, respectively. The SoC 104 processes the first and second input image lines based on first and second sets of configuration parameters (CPs) associated with the first and second image sensors 102a and 102b, to generate first and second processed image lines, respectively. Each set of CPs includes at least one of a color, a gain, a region of interest, a resolution, a frame number, a line number and the like, of an input image line, such as the first or second input image line, captured by an image sensor, such as the first or second image sensor 102a or 102b.

Figure 2:
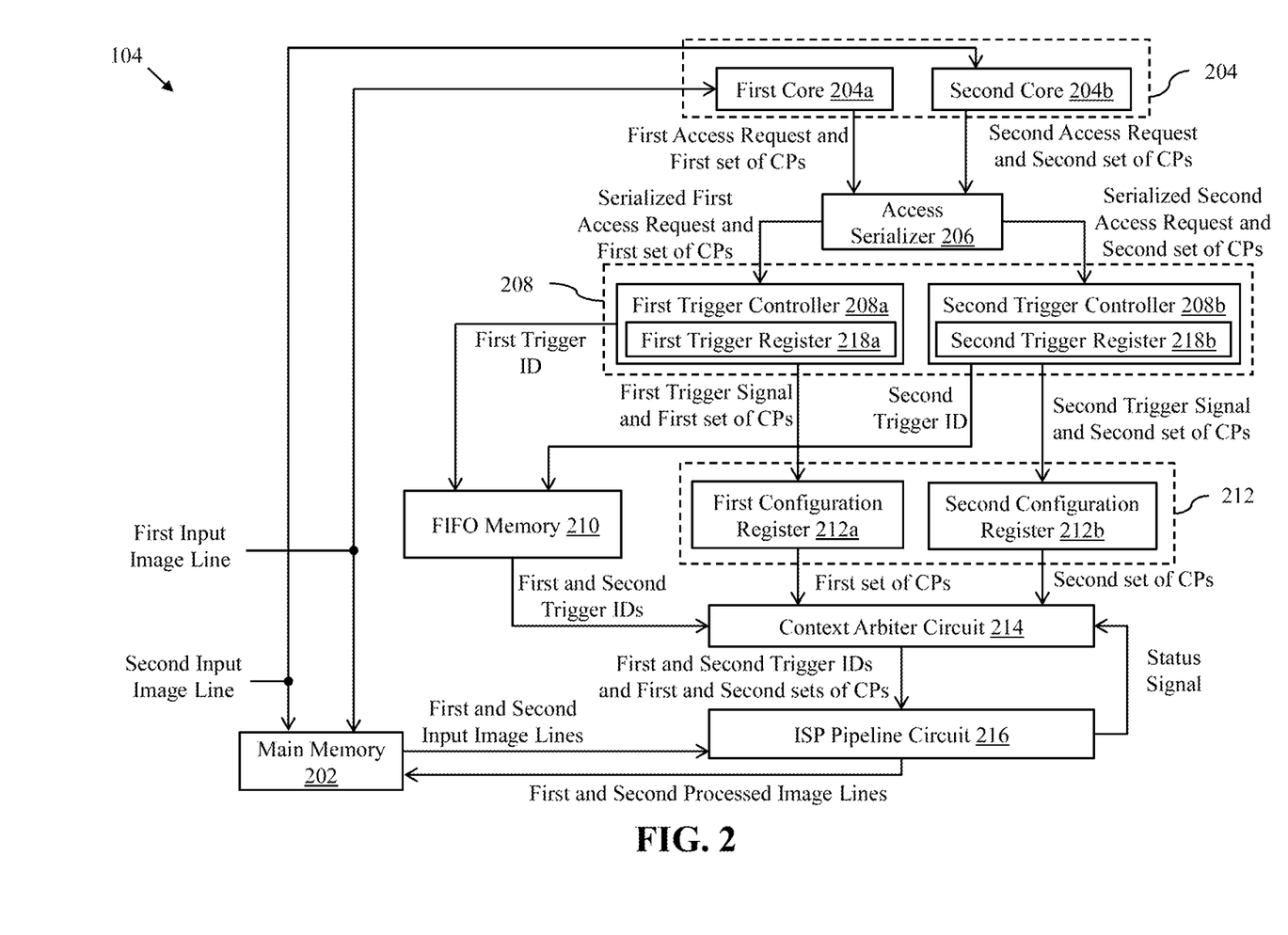
FIG. 2 is a schematic block diagram of a System-on-Chip (SoC) of the system of FIG. 1 in accordance with an embodiment of the present invention.

Referring now to FIG. 2, a schematic block diagram of the SoC 104, in accordance with an embodiment of the present invention is shown. The SoC 104 includes a main memory 202, a set of cores 204 of which first and second cores 204a and 204b are shown, an access serializer 206, and multiple trigger controllers 208 of which first and second trigger controllers 208a and 208b are shown. The SoC 104 further includes a first-in-first-out (FIFO) memory 210, multiple configuration registers 212 of which first and second configuration registers 212a and 212b are shown, a context arbiter circuit 214, and an image signal processing (ISP) pipeline circuit 216.

The main memory 202 is connected to the first and second image sensors 102a and 102b for receiving the first and second input image lines, respectively. In one example, the main memory 202 is a random-access memory (RAM), such as a video RAM. The main memory 202 stores the received first and second input image lines.

The first and second cores 204a and 204b are connected to the first and second image sensors 102a and 102b for receiving the first and second input image lines, respectively. To trigger the processing of the first and second input image lines, the first and second cores 204a and 204b generate first and second access requests and the first and second sets of CPs, respectively. Thus, the first set of CPs is associated with the first access request and the second set of CPs is associated with the second access request. It will be apparent to those of skill in the art that the scope of the SoC 104 is not limited to two cores, and may include any number of cores without deviating from the scope of the invention. It will further be apparent to those of skill in the art that even though in the current embodiment, the first and second cores 204a and 204b are connected to the first and second image sensors 102a and 102b, and generate the first and second access requests, respectively, in other embodiments, a single core, such as the first core 204a, is connected to both the first and second image sensors 102a and 102b, and generates the first and second access requests, respectively.

The access serializer 206 is connected to the first and second cores 204a and 204b for receiving the first and second access requests, and the first and second sets of CPs, respectively. The access serializer 206 serializes the first and second access requests to output the serialized first and second access requests. In an embodiment, the access serializer 206 executes a scheduling algorithm such as a round-robin scheduling algorithm, to serialize the first and second access requests and output the serialized first and second access requests one after the other. In an example, when the first access request is received before the second access request, the access serializer 206 outputs the first access request before the second access request. In another example, when the first and second access requests are received simultaneously at the same time instant or during a single clock cycle, the access serializer 206 outputs the first and second access requests one after the other (i.e., outputs the first access request or the second access request). The access serializer 206 further outputs the first and second sets of CPs.

The first and second trigger controllers 208a and 208b are connected to the access serializer 206 for receiving the serialized first and second access requests and the first and second sets of CPs, respectively. The first and second trigger controllers 208a and 208b decode the serialized first and second access requests to generate first and second trigger signals and first and second trigger identifiers (IDs), respectively. Each trigger ID is associated with a corresponding input image line and is generated to trigger the processing of an input image line that is associated with the corresponding access request. The first and second trigger controllers 208a and 208b include first and second trigger registers 218a and 218b that generate the first and second trigger signals, respectively. The first and second trigger registers 218a and 218b activate the first and second trigger signals, when the first and second trigger controllers 208a and 208b decode the serialized first and second access requests, respectively. Further, the first and second trigger IDs may be generated by a decoder (not shown) in each of the first and second trigger controllers 208a and 208b, respectively.

It will be apparent to those of skill in the art that the scope of the SoC 104 is not limited to two trigger controllers, and may include any number of trigger controllers based on a number of image sensors without deviating from the scope of the invention.

The FIFO memory 210 is connected to the first and second trigger controllers 208a and 208b for receiving the first and second trigger IDs, respectively. Based on the order of reception of the first and second trigger IDs, the FIFO memory 210 stores and outputs the first and second trigger IDs. In one example, the first trigger ID is received before the reception of the second trigger ID. Thus, the FIFO memory 210 outputs the first trigger ID before outputting the second trigger ID. It will be understood by those of skill in the art that if the second trigger ID is received before the first trigger ID, the FIFO memory 210 outputs the second trigger ID before the first trigger ID. For the sake of ongoing discussion and without deviating from the scope of the invention, it is assumed that the FIFO memory 210 receives the first trigger ID before the second trigger ID.

The first and second configuration registers 212a and 212b are connected to the first and second trigger controllers 208a and 208b for receiving the first and second trigger signals, respectively. When the first and second trigger signals are active, the first and second configuration registers 212a and 212b receive the first and second sets of CPs from the first and second trigger controllers 208a and 208b, respectively.

The context arbiter circuit 214 is connected to the FIFO memory 210 for receiving a trigger ID, such as the first trigger ID. The context arbiter circuit 214 further receives a status signal indicating an availability of the ISP pipeline circuit 216 for receiving a trigger ID, such as the first trigger ID. Based on the first trigger ID, the context arbiter circuit 214 selects a configuration register, such as the first configuration register 212a, for receiving the associated set of CPs, such as the first set of CPs, therefrom. The context arbiter circuit 214 further outputs and provides the first trigger ID and the first set of CPs to the ISP pipeline circuit 216.

The ISP pipeline circuit 216 is connected to the context arbiter circuit 214 and the main memory 202. The ISP pipeline circuit 216 receives a trigger ID, such as the first trigger ID, and a set of CPs, such as the first set of CPs, from the context arbiter circuit 214 when the first set of CPs is completely received by the first configuration register 212a and the status signal is active. Based on the first trigger ID, the ISP pipeline circuit 216 receives the first input image line from the main memory 202. The first input image line is thus processed by the ISP pipeline circuit 216 to generate a first processed image line. The generation of the first processed image line is explained in detail in conjunction with FIG. 3.

The ISP pipeline circuit 216 further generates the status signal and provides the status signal to the context arbiter circuit 214. The ISP pipeline circuit 216 activates the status signal (i.e., the status signal is in an active state) when the ISP pipeline circuit 216 is available for receiving a trigger ID, such as the first trigger ID, and deactivates the status signal (i.e., the status signal is in an inactive state) when the ISP pipeline circuit 216 is unavailable for receiving the first trigger ID. In one example, when the ISP pipeline circuit 216 is processing a previous input image line, the ISP pipeline circuit 216 is unavailable for receiving the first trigger ID. Thus, the status signal is deactivated during the processing of the first input image line to indicate unavailability of the ISP pipeline circuit 216 for receiving a next trigger ID, such as the second trigger ID.

On generation of the first processed image line, the status signal is activated to indicate availability of the ISP pipeline circuit 216 for receiving the next trigger ID. Thus, ISP pipeline circuit 216 receives the second trigger ID and the second set of CPs from the context arbiter circuit 214. Based on the second set of CPs, the ISP pipeline circuit 216 receives the second input image line that is associated with the second trigger ID from the main memory 202 and processes the second input image line to generate the second processed image line. Further, the main memory 202 is connected to the ISP pipeline circuit 216 for receiving and storing the first and second processed image lines. Thus, the ISP pipeline circuit 216 processes the first and second input image lines based on an order of reception of the first and second trigger IDs by the ISP pipeline circuit 216. Similarly, the ISP pipeline circuit 216 processes each input image line of the first and second sets of input image lines to generate first and second sets of processed image lines, thereby processing the first and second input images, respectively. A time duration between processing of two input image lines by the ISP pipeline circuit 216, for which the ISP pipeline circuit 216 is ideal and the status signal is thus activated, is a runout time of the ISP pipeline circuit 216.

Figure 3:
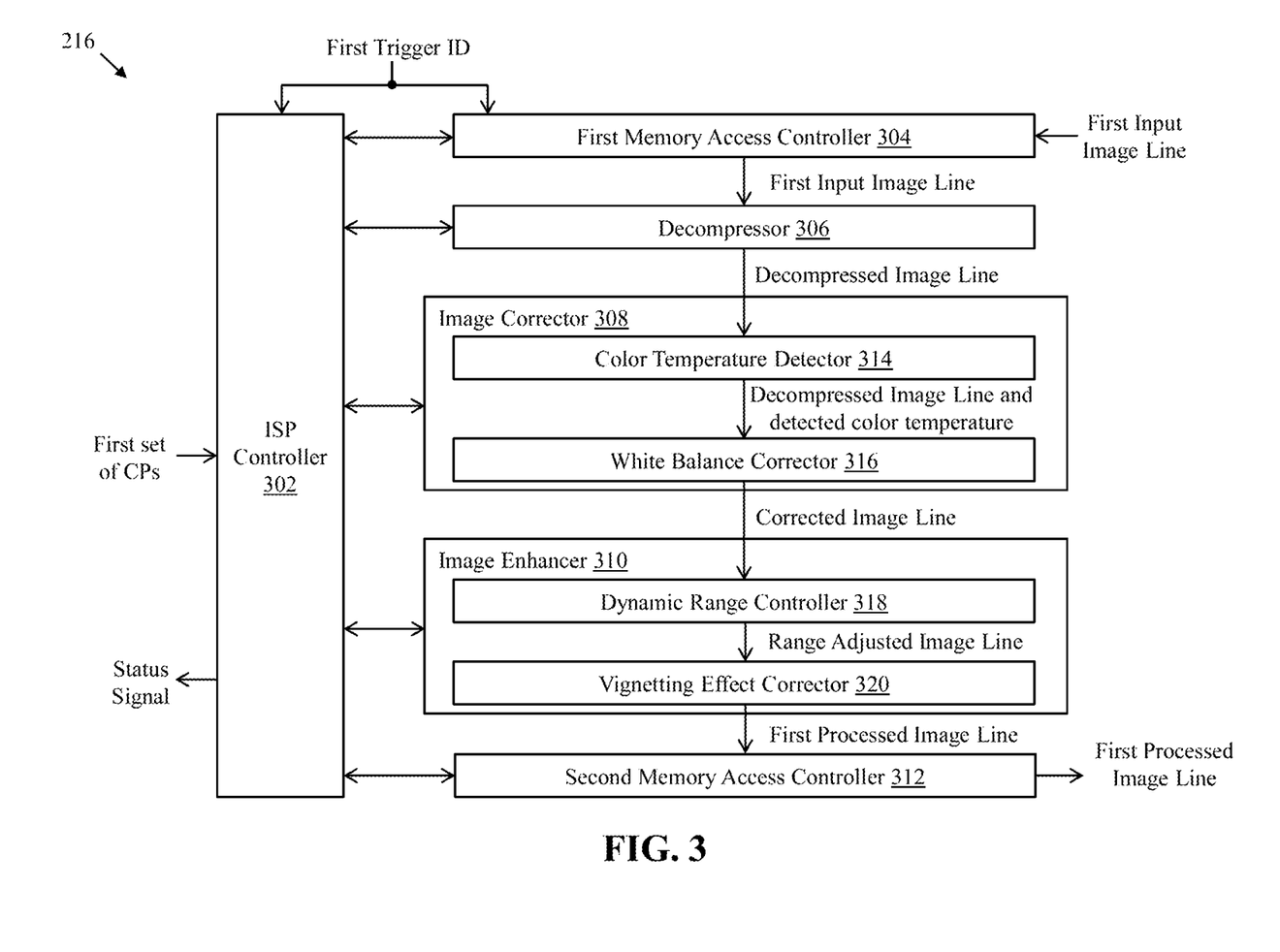
FIG. 3 is a schematic block diagram of an image signal processing (ISP) pipeline circuit of the SoC of FIG. 2 in accordance with an embodiment of the present invention.

Referring now to FIG. 3, a schematic block diagram of the ISP pipeline circuit 216, in accordance with an embodiment of the present invention is shown. The ISP pipeline circuit 216 is divided into multiple stages for processing the input image lines such that each stage executes an image processing function. Examples of the image processing functions include image decompression, color temperature detection, white balance correction, dynamic range adjustment, vignetting effect correction, and the like.

The ISP pipeline circuit 216 includes an ISP controller 302 that controls, i.e., activates or deactivates, each stage for executing the image processing function. In one embodiment, the stages of the ISP pipeline circuit 216 include a first memory access controller 304, a decompressor 306, an image corrector 308, an image enhancer 310, and a second memory access controller 312. The ISP controller 302 is connected to the context arbiter circuit 214 for receiving the first trigger ID and the first set of CPs. Based on the first trigger ID and the first set of CPs, the ISP controller 302 controls the first memory access controller 304, the decompressor 306, the image corrector 308, the image enhancer 310, and the second memory access controller 312, for processing the first input image line, one at a time. Further, the ISP controller 302 activates the status signal when the received input image line (i.e., the first input image line associated with the first trigger ID) is processed and deactivates the status signal during the processing of the received input image line.

The first memory access controller 304 is connected to the context arbiter circuit 214 and the ISP controller 302. The ISP controller 302 controls the first memory access controller 304 for receiving the first trigger ID from the context arbiter circuit 214. Based on the first trigger ID, the first memory access controller 304 accesses the main memory 202 to receive the first input image line. Further, the first memory access controller 304 outputs the first input image line.

The decompressor 306 is connected to the first memory access controller 304 and the ISP controller 302. The ISP controller 302 controls the decompressor 306 for receiving the first input image line from the first memory access controller 304. The decompressor 306 decompresses the first input image line to generate and output a decompressed image line.

The image corrector 308 is connected to the decompressor 306 and the ISP controller 302. The ISP controller 302 controls the image corrector 308 for receiving the decompressed image line from the decompressor 306. The image corrector 308 includes a color temperature detector 314 and a white balance corrector 316. The color temperature detector 314 receives the decompressed image line and detects a color temperature of the decompressed image line. Further, the color temperature detector 314 provides the detected color temperature and the decompressed image line to the white balance corrector 316. Based on the detected color temperature, the white balance corrector 316 corrects a white balance of the decompressed image line to generate a corrected image line. The image corrector 308 thus outputs the corrected image line.

The image enhancer 310 is connected to the image corrector 308 and the ISP controller 302. The ISP controller 302 controls the image enhancer 310 for receiving the corrected image line from the image corrector 308. The image enhancer 310 includes a dynamic range controller 318 and a vignetting effect corrector 320. The dynamic range controller 318 adjusts and corrects a dynamic range of the corrected image line to generate a range adjusted image line. The vignetting effect corrector 320 is connected to the dynamic range controller 318 for receiving the range adjusted image line. The vignetting effect corrector 320 corrects a vignetting effect in the range adjusted image line to generate the first processed image line. The image enhancer 310 thus outputs the first processed image line.

The second memory access controller 312 is connected to the image enhancer 310 and the ISP controller 302. The ISP controller 302 controls the second memory access controller 312 for receiving the first processed image line from the image enhancer 310. The second memory access controller 312 accesses the main memory 202 to store the first processed image line. It will be understood by those of skill in the art that the ISP pipeline circuit 216 processes each input image line in a manner similar to the processing of the first input image line.

Referring now to FIGS. 4A-4D, block diagrams 400a-400d illustrating an operation of the ISP pipeline circuit 216, in accordance with an embodiment of the present invention, are shown. The ISP pipeline circuit 216 processes an input image, such as a first input image, by processing a set of input image lines, such as the first and third through seventh input image lines, of the first input image. The ISP pipeline circuit 216 thus generates a set of processed image lines of the first input image. One of first and second sub-blocks 402a and 402b of the ISP pipeline circuit 216 execute a corresponding image processing function (i.e., image decompression, image correction, and image enhancement) that is described in FIG. 3. In one example, the first and second sub-blocks 402a and 402b execute first and second image processing functions such as image decompression and image enhancement, respectively. Thus, the first and second sub-blocks 402a and 402b act as the decompressor 306 and the image enhancer 310, respectively.

Each sub-block may process a set number of input image lines that is based on the image processing function of each sub-block. Further, the number of input image lines required for executing a corresponding image processing function is determined by the ISP controller 302. In an embodiment, each of the first and second sub-blocks 402a and 402b require one input image line for executing the corresponding image processing function. In another embodiment, each of the first and second sub-blocks 402a and 402b require more than one (in an example, three) input image lines for executing the corresponding image processing function. In yet another embodiment, the first sub-block 402a requires one input image line and the second sub-block 402b requires three input image lines for executing the corresponding image processing functions. In the presently preferred embodiment, it is assumed that the first and second sub-blocks 402a and 402b require one and three input image lines for executing the corresponding image processing functions, respectively.

Figure 4A:
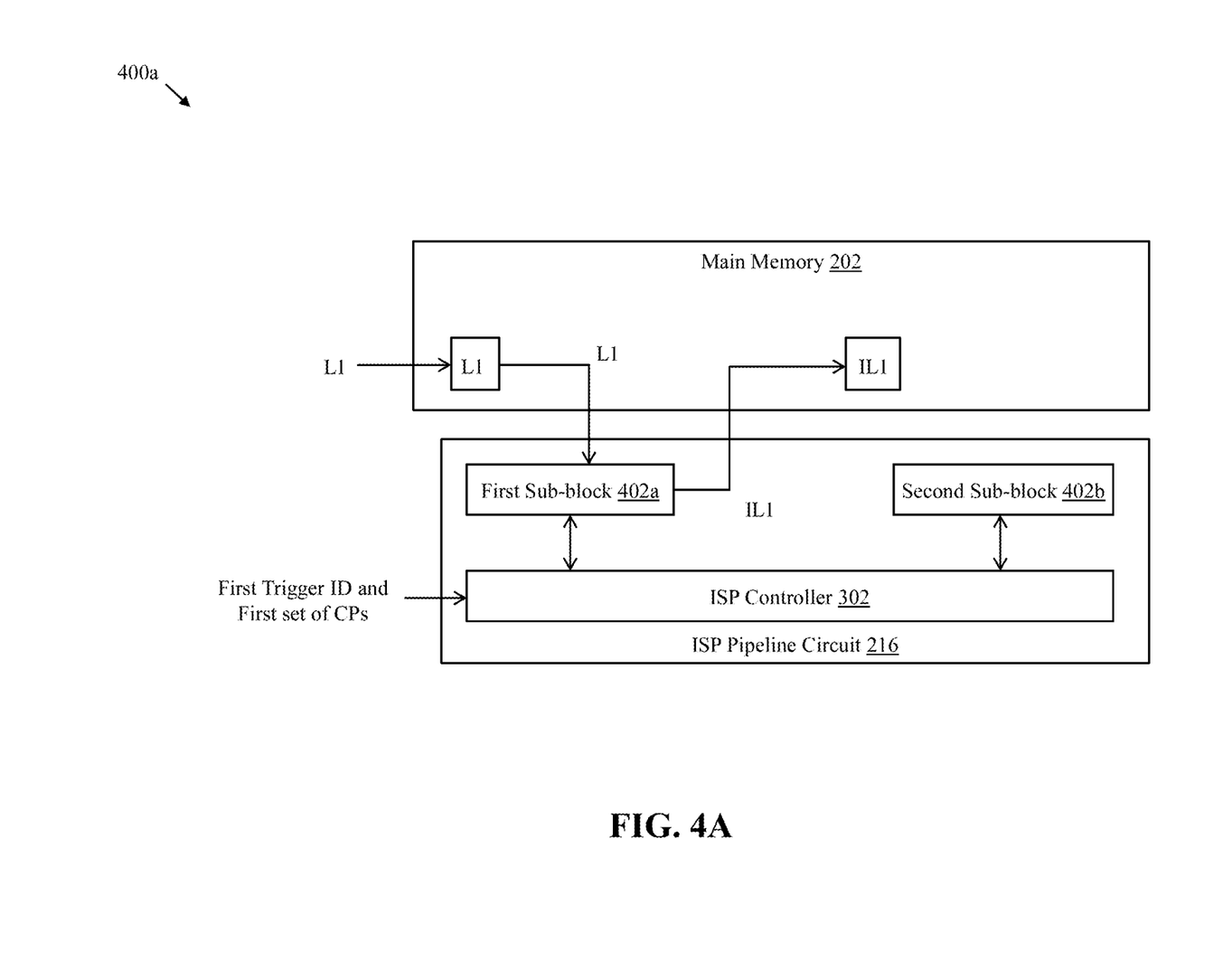
FIGS. 4A-4D are block diagrams that, collectively, illustrate an operation of the ISP pipeline circuit of FIG. 3 in accordance with an embodiment of the present invention.

Referring now to FIG. 4A, the block diagram 400a illustrates an operation of the ISP pipeline circuit 216 for processing the first input image line L1 by the first sub-block 402a. The first image sensor 102a captures and stores the first input image line L1 in the main memory 202. Thus, the first trigger ID is generated by the first trigger controller 208a. The ISP controller 302 receives the first trigger ID and the first set of CPs. Based on the first trigger ID and the first set of CPs, the ISP controller 302 controls, i.e., triggers the first sub-block 402a to process the first input image line L1. The first sub-block 402a executes the first image processing function on the first input image line L1 to generate a first intermediate image line IL1, and stores the first intermediate image line IL1 (i.e., the decompressed image line) in the main memory 202. As the second sub-block 402b requires three input image lines, thus the ISP controller 302 waits to trigger the second sub-block 402b till the generation of two additional intermediate lines, and remains deactivated by the ISP controller 302.

Figure 4B:
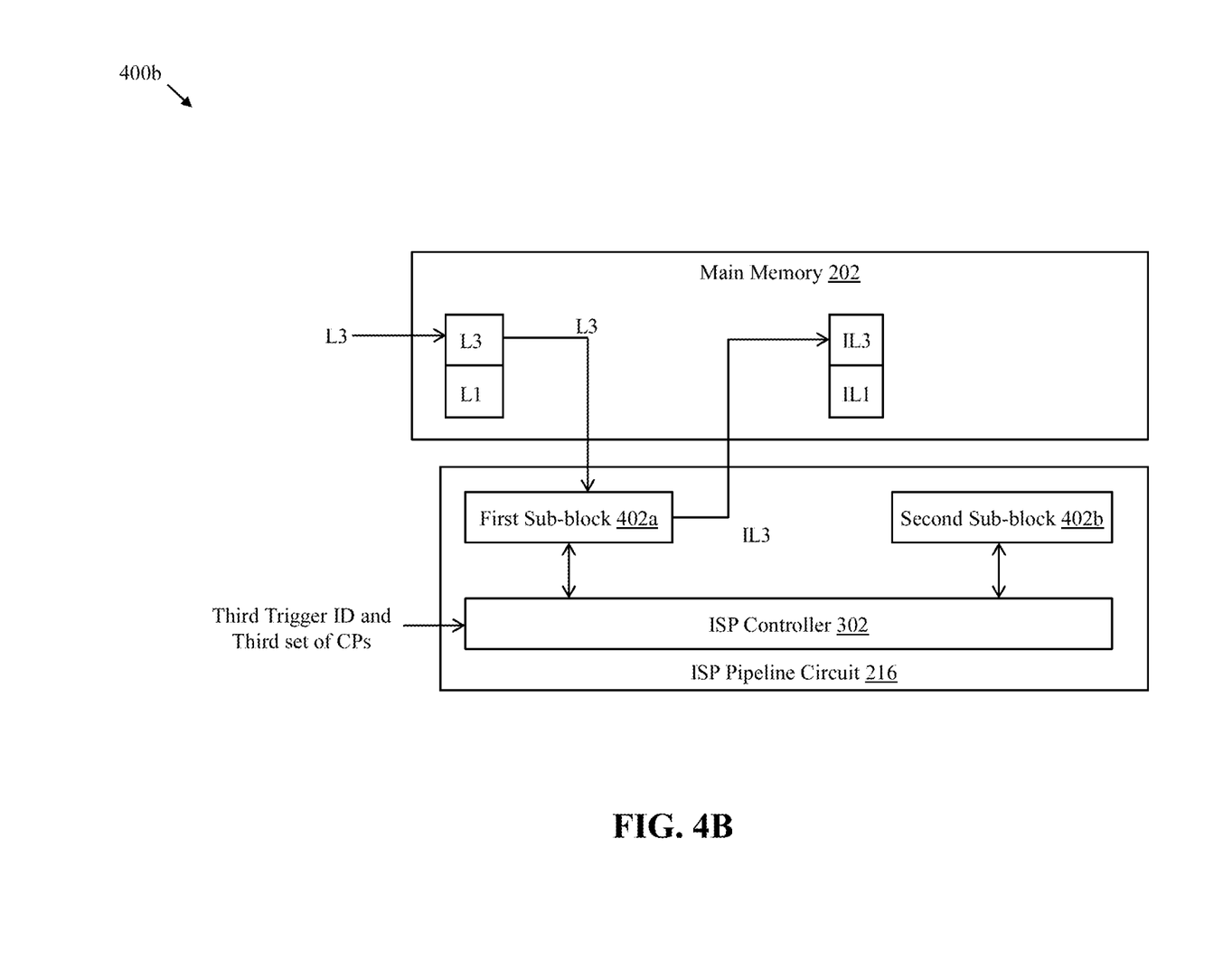

Referring now to FIG. 4B, the block diagram 400b illustrates an operation of the ISP pipeline circuit 216 for processing the third input image line L3 by the first sub-block 402a. The first image sensor 102a captures and stores the third input image line L3 in the main memory 202. A third trigger ID is generated by the first trigger controller 208a for processing the third input image line L3. In an embodiment, the third trigger ID is associated with a third access request (not shown) that is generated by the first core 204a. The ISP controller 302 thus receives the third trigger ID and a third set of CPs. It will be understood by those of skill in the art that the third trigger ID and the third set of CPs are generated in a manner similar to the generation of the first trigger ID and the first set of CPs, respectively. Based on the third trigger ID and the third set of CPs, the ISP controller 302 triggers the first sub-block 402a to process the third input image line L3. The first sub-block 402a executes the first image processing function on the third input image line L3 to generate a third intermediate image line IL3, and stores the third intermediate image line IL3 in the main memory 202.

Figure 4C:
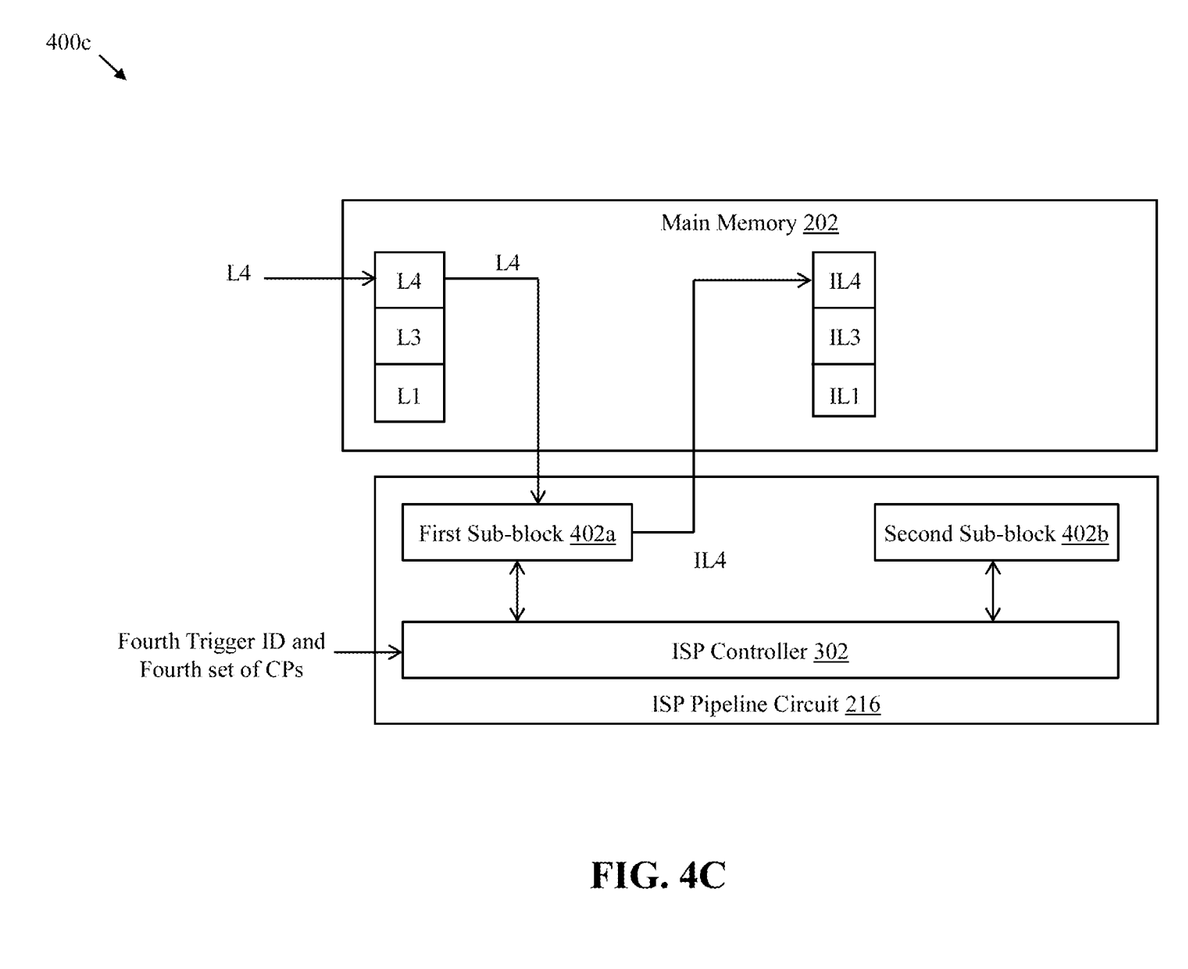

Referring now to FIG. 4C, the block diagram 400c illustrates an operation of the ISP pipeline circuit 216 for processing the fourth input image line L4 by the first sub-block 402a. The first image sensor 102a captures and stores the fourth input image line L4 in the main memory 202. Thus, a fourth trigger ID is generated by the first trigger controller 208a. In an embodiment, the fourth trigger ID is associated with a fourth access request (not shown) that is generated by the first core 204a. The ISP controller 302 thus receives the fourth trigger ID and a fourth set of CPs. It will be understood by those of skill in the art that the fourth trigger ID and the fourth set of CPs are generated in a manner similar to the generation of the first trigger ID and the first set of CPs, respectively. Based on the fourth trigger ID and the fourth set of CPs, the ISP controller 302 triggers the first sub-block 402a to process the fourth input image line L4. The first sub-block 402a executes the first image processing function on the fourth input image line L4 to generate a fourth intermediate image line IL4, and stores the fourth intermediate image line IL4 in the main memory 202.

After generating the first, third, and fourth access requests, the first core 204a generates a fifth access request (not shown) that is based on the first, third, and fourth access requests, and a fifth set of CPs that is based on the first, third, and fourth sets of CPs. The fifth set of CPs thus includes information associated with processing of the first, third, and fourth intermediate image lines IL1, IL3, and IL4. Further, a fifth trigger ID associated with the fifth access request, is generated in a manner similar to the generation of the first trigger ID.

Figure 4D:
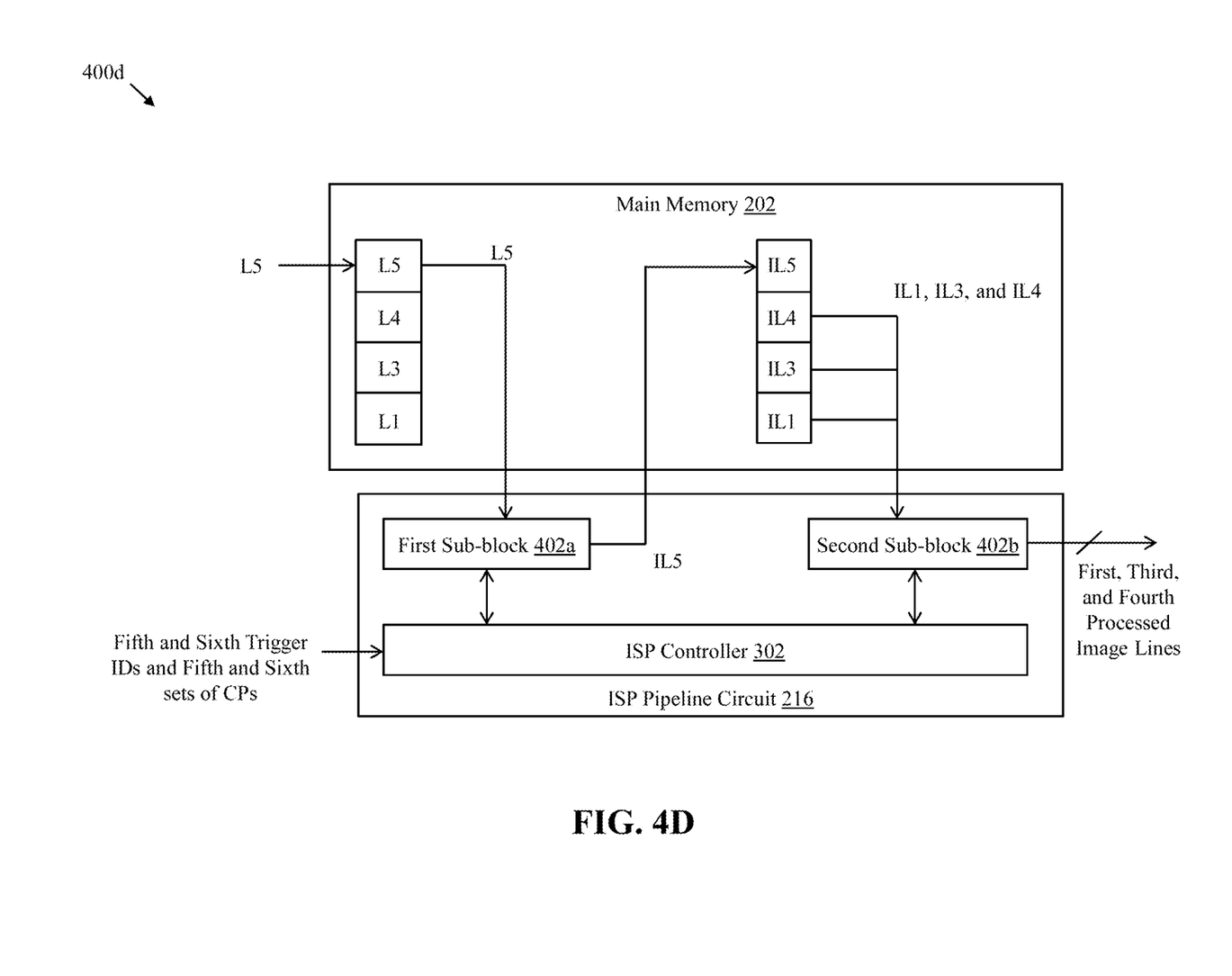

Referring now to FIG. 4D, the block diagram 400d illustrates an operation of the ISP pipeline circuit 216 for processing the fifth input image line L5 by the first sub-block 402a. The first image sensor 102a captures and stores the fifth input image line L5 in the main memory 202. Thus, a sixth trigger ID is generated by the first trigger controller 208a for processing the fifth input image line L5. The FIFO memory 210 receives the fifth trigger ID before the sixth trigger ID, and outputs the fifth trigger ID before the sixth trigger ID. The ISP controller 302 receives the fifth trigger ID and the fifth set of CPs. Based on the fifth trigger ID and the fifth set of CPs, the ISP controller 302 controls the second sub-block 402b to process the first, third, and fourth intermediate image lines IL1, IL3, and IL4. The second sub-block 402b executes the second image processing function on the first, third, and fourth intermediate image lines IL1, IL3, and IL4 and generates the first, third, and fourth processed image lines (not shown), respectively. The second sub-block 402b stores the first, third, and fourth processed image lines in the main memory 202.

After processing the first, third, and fourth intermediate image lines IL1, IL3, and IL4, the ISP controller 302 receives the sixth trigger ID and a sixth set of CPs. It will be understood by those of skill in the art that the sixth trigger ID and the sixth set of CPs are generated in a manner similar to the generation of the first trigger ID and the first set of CPs, respectively. Based on the sixth trigger ID and the sixth set of CPs, the ISP controller 302 triggers the first sub-block 402a to process the fifth input image line L5. The first sub-block 402a executes the first image processing function on the fifth input image line L5 to generate a fifth intermediate image line IL5, and stores the fifth intermediate image line IL5 in the main memory 202. Further, sixth and seventh intermediate image lines (not shown) are generated in a manner similar to the generation of the third and fourth intermediate image lines IL3 and IL4, respectively. It will be understood by those of skill in the art that the first input image is thus processed by processing each of the first and third through seventh input image lines L1, and L3-L7 to generate the first and third through seventh processed image lines, respectively.

Figure 5A:
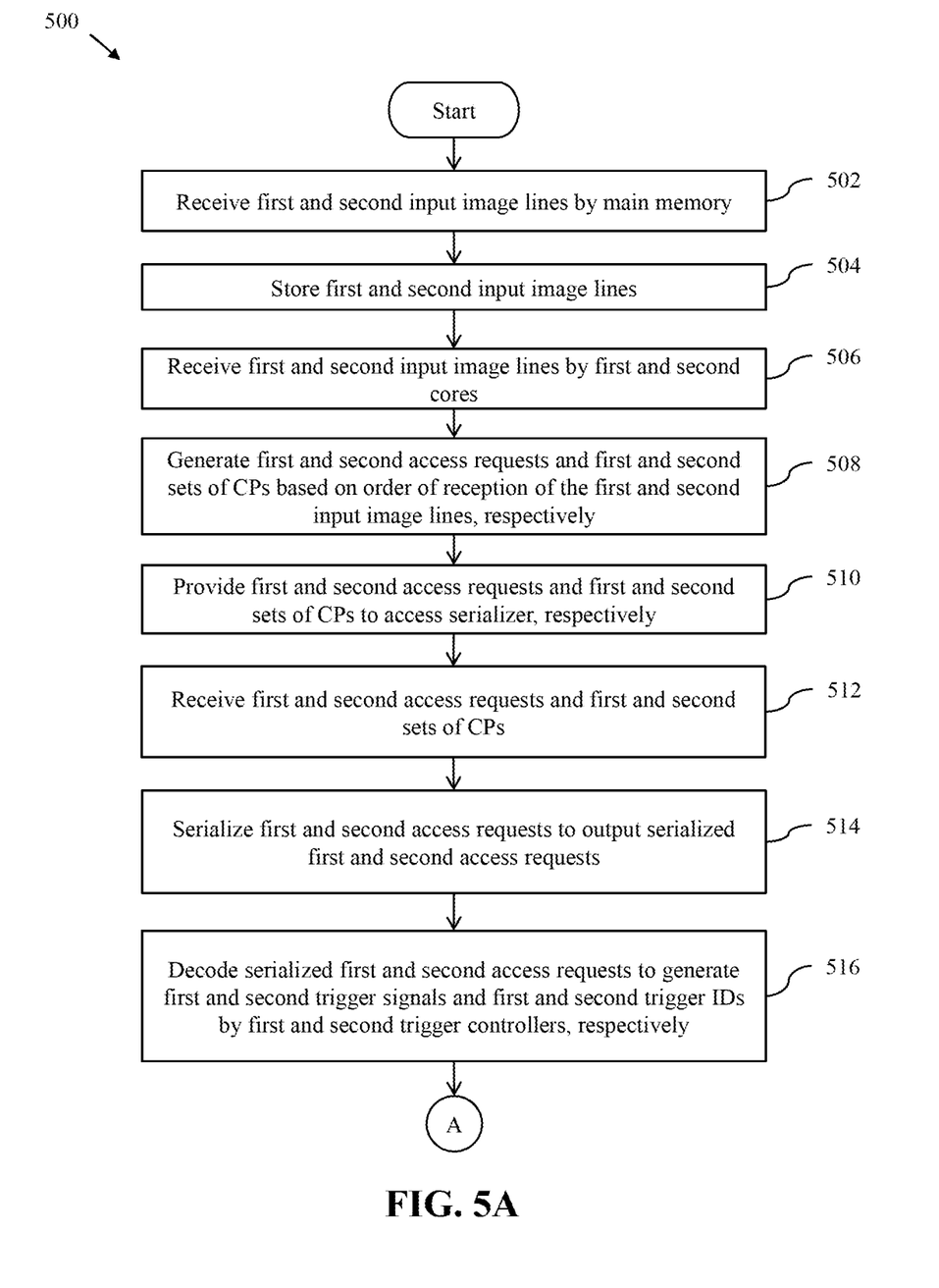
FIGS. 5A-5C, collectively, represent a flow chart that illustrates a method for processing multiple input images by the SoC of FIG. 2 in accordance with an embodiment of the present invention.
Figure 5B:
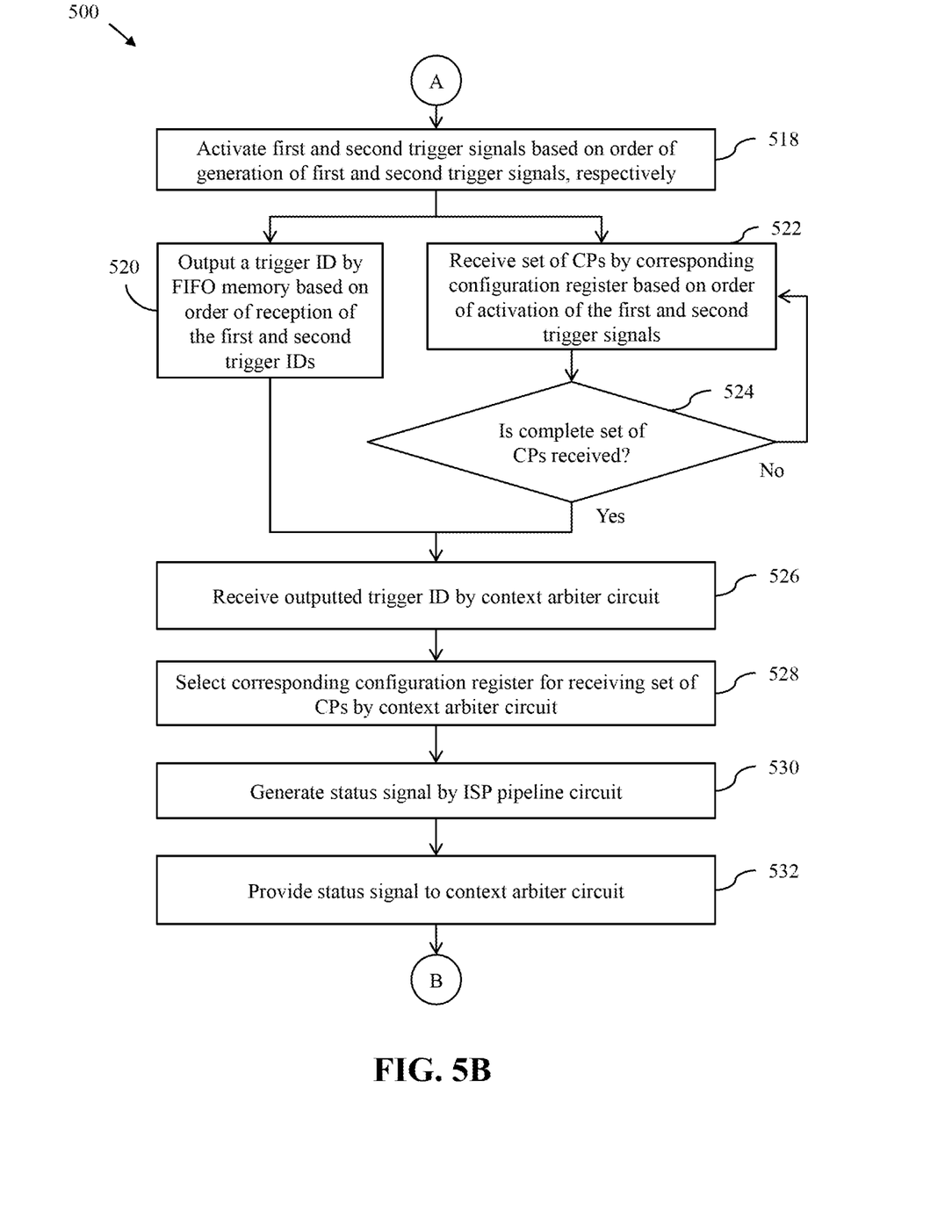
Figure 5C:
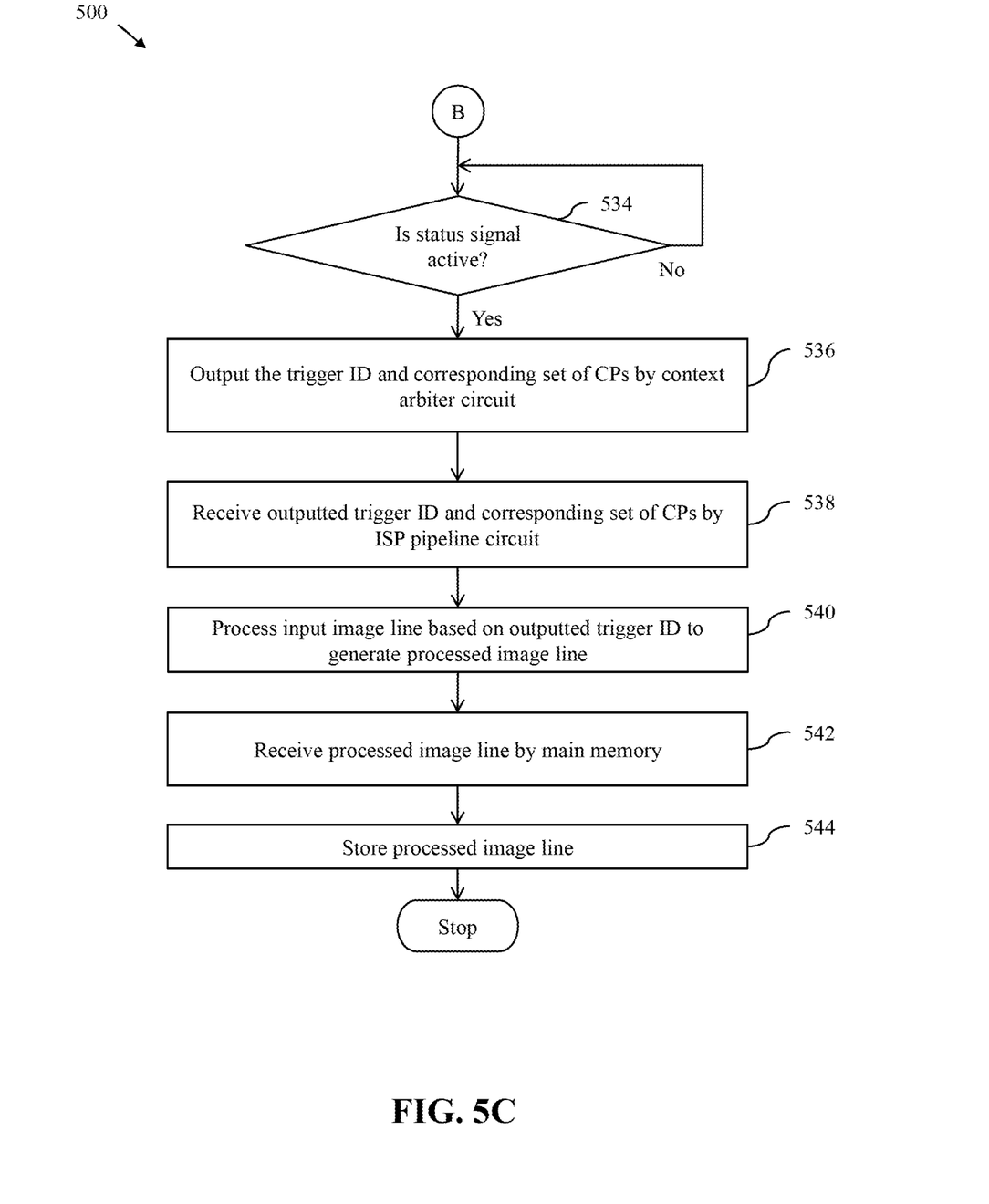

Referring now to FIGS. 5A-5C, a flow chart 500 illustrating a method for processing multiple input images by the SoC 104 in accordance with an embodiment of the present invention is shown.

At step 502, the main memory 202 receives the first and second input image lines from the first and second image sensors 102a and 102b, respectively. The first and second image sensors 102a and 102b have different resolutions and different frame rates. At step 504, the main memory 202 stores the first and second input image lines. At step 506, the first and second cores 204a and 204b receive the first and second input image lines from the first and second image sensors 102a and 102b, respectively.

At step 508, the first and second cores 204a and 204b generate the first and second access requests and the first and second sets of CPs, respectively. The first and second access requests and the first and second sets of CPs are generated based on an order of reception of the first and second input image lines, respectively. At step 510, the first and second cores 204a and 204b provide the first and second access requests and the first and second sets of CPs to the access serializer 206, respectively.

At step 512, the access serializer 206 receives the first and second access requests and the first and second sets of CPs. At step 514, the access serializer 206 serializes the first and second access requests, by executing the scheduling algorithm, to output the serialized first and second access requests one after the other. At step 516, the first and second trigger controllers 208a and 208b decode the serialized first and second access requests to generate the first and second trigger signals and the first and second trigger IDs, respectively. At step 518, the first and second trigger registers 218a and 218b activate the first and second trigger signals, when the first and second trigger controllers 208a and 208b decode the serialized first and second access requests, respectively. The first and second trigger signals are activated based on an order of generation of the first and second trigger signals, respectively. After step 518, steps 520 and 522 are executed simultaneously.

At step 520, the FIFO memory 210 outputs the first and second trigger IDs based on the order of reception of the first and second trigger IDs by the FIFO memory 210 from the first and second trigger controllers 208a and 208b, respectively. For the sake of ongoing discussion and without deviating from the scope of the invention, it is assumed that the first trigger ID is outputted before the second trigger ID. At step 522, a configuration register, such as the first configuration register 212a, receives a set of CPs, such as the first set of CPs, when the first trigger signal is active. The set of CPs are received by the corresponding configuration register based on an order of activation of the first and second trigger signals. At step 524, the first configuration register 212a determines whether the complete first set of CPs is received by the first configuration register 212a since the first trigger signal is activated. If at step 524, the first configuration register 212a determines that the complete first set of CPs is not received, step 522 is executed. If at step 524, the first configuration register 212a determines that the complete first set of CPs is received, step 526 is executed. After steps 520 and 524, step 526 is executed.

At step 526, the context arbiter circuit 214 receives the outputted trigger ID, such as the first trigger ID, from the FIFO memory 210. At step 528, the context arbiter circuit 214 selects corresponding configuration register, such as the first configuration register 212*a*, for receiving the first set of CPs from the first configuration register 212*a*. At step 530, the ISP pipeline circuit 216 generates the status signal to indicate availability of the ISP pipeline circuit 216 for receiving the first trigger ID. The status signal is in the active state when the ISP pipeline circuit 216 is available for receiving the first trigger ID, and the status signal is in an inactive state when the ISP pipeline circuit 216 is unavailable for receiving the first trigger ID.

At step 532, the ISP pipeline circuit 216 provides the status signal to the context arbiter circuit 214. At step 534, the context arbiter circuit 214 determines whether the status signal is in the active state. If at step 534, the context arbiter circuit 214 determines that the status signal is in the inactive state, the context arbiter circuit 214 waits for the status signal to be activated. If at step 534, the context arbiter circuit 214 determines that the status signal is in the active state, step 536 is executed. At step 536, the context arbiter circuit 214 outputs the received trigger ID, i.e., the first trigger ID, and the corresponding set of CPs, such as the first set of CPs.

At step 538, the ISP pipeline circuit 216 receives the first trigger ID and the first set of CPs from the context arbiter circuit 214, when the first set of CPs is completely received by the first configuration register 212*a* and the status signal is active. At step 540, based on the first trigger ID and the first set of CPs, the ISP pipeline circuit 216 processes an input image line, i.e., the first input image line, to generate a processed image line, i.e., the first processed image line. The steps for processing of the first input image line are explained in detail in FIG. 5.

At step 542, the main memory 202 receives the first processed image line from the ISP pipeline circuit 216. At step 544, the main memory 202 stores the first processed image line. It will be apparent to a person skilled in the art that for generation of the second processed image line, the FIFO memory 210 outputs the second trigger ID after outputting the first trigger ID and the steps 522-540 are executed for processing of the second input image line. Further, the steps 542 and 544 are executed to receive the second processed image line by the main memory 202 and store the second processed image line in the main memory 202, respectively. Thus, the ISP pipeline circuit 216 processes each input image line of the first and second sets of input image lines to generate first and second sets of processed image lines, thereby processing the first and second input images, respectively.

Figure 6:
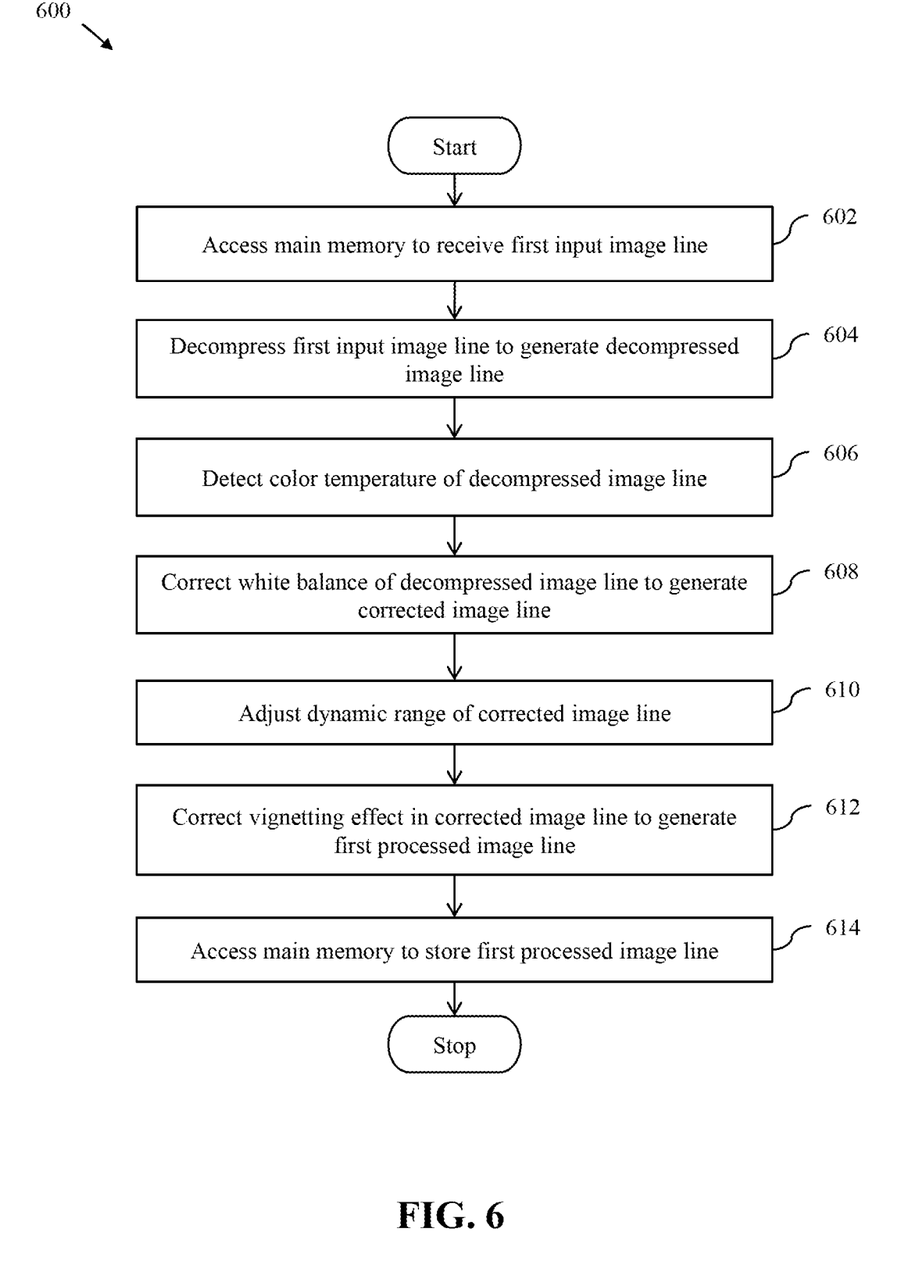
FIG. 6 is a flow chart that illustrates a method for processing an input image line by the ISP pipeline circuit of FIG. 3 in accordance with an embodiment of the present invention.

Referring now to FIG. 6, a flow chart 600 illustrating a method for processing the first input image line by the ISP pipeline circuit 216, in accordance with an embodiment of the present invention is shown.

At step 602, the first memory access controller 304 accesses the main memory 202 to receive the first input image line. At step 604, the decompressor 306 decompresses the first input image line to generate the decompressed image line. At step 606, the image corrector 308 detects the color temperature of the decompressed image line. At step 608, based on the detected color temperature, the image corrector 308 corrects the white balance of the decompressed image line to generate the corrected image line.

At step 610, the image enhancer 310 adjusts the dynamic range of the corrected image line. At step 612, the image enhancer 310 corrects the vignetting effect in the corrected image line to generate the first processed image line. At step 614, the second memory access controller 312 accesses the main memory 202 to store the first processed image line.

It will be apparent to those of skill in the art that the ISP pipeline circuit 216 processes the second input image line in a manner similar to the processing of the first input image line.

The ISP pipeline circuit 216 processes an input image line, such as the first input image line, based on a set of CPs (i.e., the first set of CPs) associated with its trigger ID, such as the first trigger ID. Thus, a quality of the first processed image line remains unaffected due to a different exposure value and a different resolution of the second image sensor 102*b* as compared to the first image sensor 102*a*. Further, the system 100 does not employ stitching of input image lines from the first and second image sensors 102*a* and 102*b*. Thus, the time required for processing each input image line is reduced, thereby reducing the latency for on-the-fly processing of each input image.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for processing a plurality of input images, the system comprising:
    an access serializer that receives a plurality of access requests associated with processing of a plurality of input image lines, and a plurality of configuration parameters associated with the plurality of input image lines, respectively, serializes the plurality of access requests, and outputs the serialized plurality of access requests and the plurality of configuration parameters, respectively, wherein each input image of the plurality of input images includes a corresponding set of input image lines of the plurality of input image lines;
    a plurality of trigger controllers that are connected to the access serializer for receiving the serialized plurality of access requests and the plurality of configuration parameters, and decode the serialized plurality of access requests to generate a plurality of trigger signals and a plurality of trigger identifiers (IDs), respectively;
    a first-in-first-out (FIFO) memory connected to the plurality of trigger controllers for receiving the plurality of trigger IDs and outputting the plurality of trigger IDs based on an order of reception of the plurality of trigger IDs; and
    an image signal processing (ISP) pipeline circuit that receives the plurality of trigger IDs, the plurality of configuration parameters, and the plurality of input image lines, and processes the plurality of input image lines to generate a plurality of processed image lines, respectively, wherein the plurality of input images are processed by processing the plurality of input image lines in an order of reception of the plurality of trigger IDs by the ISP pipeline circuit, respectively, and wherein a first input image line of the plurality of input image lines is processed based on a first trigger ID of the plurality of trigger IDs and a first set of configuration parameters of the plurality of configuration parameters, to generate a first processed image line of the plurality of processed image lines.

2. The system of claim 1, further comprising:
a set of cores that receives the plurality of input image lines, generates the plurality of access requests and the plurality of configuration parameters, and is connected to the access serializer for providing the plurality of access requests and the plurality of configuration parameters.

3. The system of claim 1, wherein a first trigger controller of the plurality of trigger controllers includes:
a first trigger register that generates a first trigger signal of the plurality of trigger signals, wherein the first trigger register activates the first trigger signal, when the first trigger controller decodes a first access request of the serialized plurality of access requests.

4. The system of claim 1, wherein the access serializer serializes the plurality of access requests by executing a scheduling algorithm such that when first and second access requests of the plurality of access requests are received simultaneously, the access serializer outputs the first and second access requests one after the other.

5. The system of claim 1, further comprising:
a plurality of configuration registers that are connected to the plurality of trigger controllers for receiving the plurality of trigger signals and a corresponding set of configuration parameters of the plurality of configuration parameters, respectively, wherein a first configuration register of the plurality of configuration registers receives the first set of configuration parameters, when a first trigger signal of the plurality of trigger signals is active.

6. The system of claim 5, further comprising:
a context arbiter circuit that is connected to the FIFO memory for receiving the first trigger ID, selects the first configuration register based on the first trigger ID for receiving the first set of configuration parameters therefrom, and provides the first trigger ID and the first set of configuration parameters, to the ISP pipeline circuit.

7. The system of claim 5, wherein the ISP pipeline circuit further generates a status signal to indicate availability of the ISP pipeline circuit for receiving the first trigger ID, wherein the ISP pipeline circuit activates the status signal when the ISP pipeline circuit is available for receiving the first trigger ID, and deactivates the status signal when the ISP pipeline circuit is unavailable for receiving the first trigger ID, and wherein the ISP pipeline circuit is unavailable when the ISP pipeline circuit is processing a previous input image line.

8. The system of claim 7, wherein the ISP pipeline circuit receives the first trigger ID and the first set of configuration parameters, when the first set of configuration parameters is completely received by the first configuration register and the status signal is active.

9. The system of claim 1, further comprising:
a plurality of image sensors that capture the plurality of input image lines, wherein the plurality of image sensors include first and second image sensors that have different resolutions and different frame rates.

10. The system of claim 1, further comprising:
a main memory that receives the plurality of input image lines, and is connected to the ISP pipeline circuit for receiving the plurality of processed image lines, and stores the plurality of input image lines and the plurality of processed image lines.

11. The system of claim 10, wherein the ISP pipeline circuit comprises:

a first memory access controller that receives the first trigger ID, accesses the main memory to receive the first input image line based on the first trigger ID, and outputs the first input image line;
a decompressor that is connected to the first memory access controller for receiving the first input image line, and decompresses the first input image line to generate a decompressed image line;
an image corrector that is connected to the decompressor for receiving the decompressed image line, detects a color temperature of the decompressed image line, and corrects a white balance of the decompressed image line based on the detected color temperature to generate a corrected image line;
an image enhancer that is connected to the image corrector for receiving the corrected image line, adjusts a dynamic range of the corrected image line, and corrects a vignetting effect in the corrected image line to generate the first processed image line; and
a second memory access controller that is connected to the image enhancer for receiving the first processed image line, and accesses the main memory for storing the first processed image line.

12. A method for processing a plurality of input images, the method comprising:
receiving, by an access serializer of a system-on-chip (SoC), a plurality of access requests associated with processing of a plurality of input image lines, respectively, wherein each input image of the plurality of input images includes a corresponding set of input image lines of the plurality of input image lines;
serializing, by the access serializer, the plurality of access requests to output the serialized plurality of access requests;
decoding, by a plurality of trigger controllers of the SoC, the serialized plurality of access requests to generate a plurality of trigger signals and a plurality of trigger identifiers (IDs), respectively;
outputting, by a first-in-first-out (FIFO) memory of the SoC, the plurality of trigger IDs based on an order of reception of the plurality of trigger IDs by the FIFO memory from the plurality of trigger controllers; and
processing, by an image signal processing (ISP) pipeline circuit of the SoC, the plurality of input image lines to generate a plurality of processed image lines, respectively, wherein the plurality of input images are processed by processing the plurality of input image lines in an order of reception of the plurality of trigger IDs by the ISP pipeline circuit, respectively, and wherein a first input image line of the plurality of input image lines is processed based on a first trigger ID of the plurality of trigger IDs and a first set of configuration parameters associated with the first input image line to generate a first processed image line of the plurality of processed image lines.

13. The method of claim 12, further comprising:
receiving, by a set of cores of the SoC, the plurality of input image lines;
generating, by the set of cores, the plurality of access requests and a plurality of configuration parameters, wherein the plurality of configuration parameters include the first set of configuration parameters; and
providing, by the set of cores to the access serializer, the plurality of access requests.

14. The method of claim 12, wherein the plurality of access requests are serialized by executing a scheduling algorithm such that when first and second access requests of the plurality of access requests are received simultaneously, the first and second access requests are outputted one after the other by the access serializer.

15. The method of claim 12, wherein a first trigger signal of the plurality of trigger signals is activated by a first trigger register included in a first trigger controller of the plurality of trigger controllers, when the first trigger controller decodes a first access request of the serialized plurality of access requests.

16. The method of claim 12, further comprising:
receiving, by a first configuration register of a plurality of configuration registers of the SoC, the first set of configuration parameters, when a first trigger signal of the plurality of trigger signals is active.

17. The method of claim 12, further comprising:
receiving, by a context arbiter circuit of the SoC from the FIFO memory, the first trigger ID;
selecting, by the context arbiter circuit based on the first trigger ID, a first configuration register of a plurality of configuration registers to receive the first set of configuration parameters therefrom; and
outputting, by the context arbiter circuit, the first trigger ID and the first set of configuration parameters.

18. The method of claim 17, further comprising:
generating, by the ISP pipeline circuit, a status signal to indicate availability of the ISP pipeline circuit for receiving the first trigger ID, wherein the status signal in an active state indicates the availability of the ISP pipeline circuit for receiving the first trigger ID, and the status signal in an inactive state indicates unavailability of the ISP pipeline circuit for receiving the first trigger ID, and wherein the ISP pipeline circuit is unavailable when the ISP pipeline circuit is processing a previous input image line;
providing, by the ISP pipeline circuit to the context arbiter circuit, the status signal; and
receiving, by the ISP pipeline circuit from the context arbiter circuit, the first trigger ID and the first set of configuration parameters, when the first set of configuration parameters is completely received by the first configuration register and the status signal is active.

19. The method of claim 12, further comprising:
receiving, by a main memory of the SoC from a plurality of image sensors and the ISP pipeline circuit, the plurality of input image lines and the plurality of processed image lines, respectively, wherein first and second image sensors of the plurality of image sensors have different resolutions and different frame rates; and
storing, by the main memory, the plurality of input image lines and the plurality of processed image lines.

20. The method of claim 19, wherein the processing of the first input image line by the ISP pipeline circuit further comprises:
accessing the main memory to receive the first input image line;
decompressing the first input image line to generate a decompressed image line;
detecting a color temperature of the decompressed image line;
correcting a white balance of the decompressed image line based on the detected color temperature to generate a corrected image line;
adjusting a dynamic range of the corrected image line;
correcting a vignetting effect in the corrected image line to generate the first processed image line; and
accessing the main memory to store the first processed image line.

* * * * *